Z. BUTT.
Truck.
No. 17,314
Patented May 19, 1857.
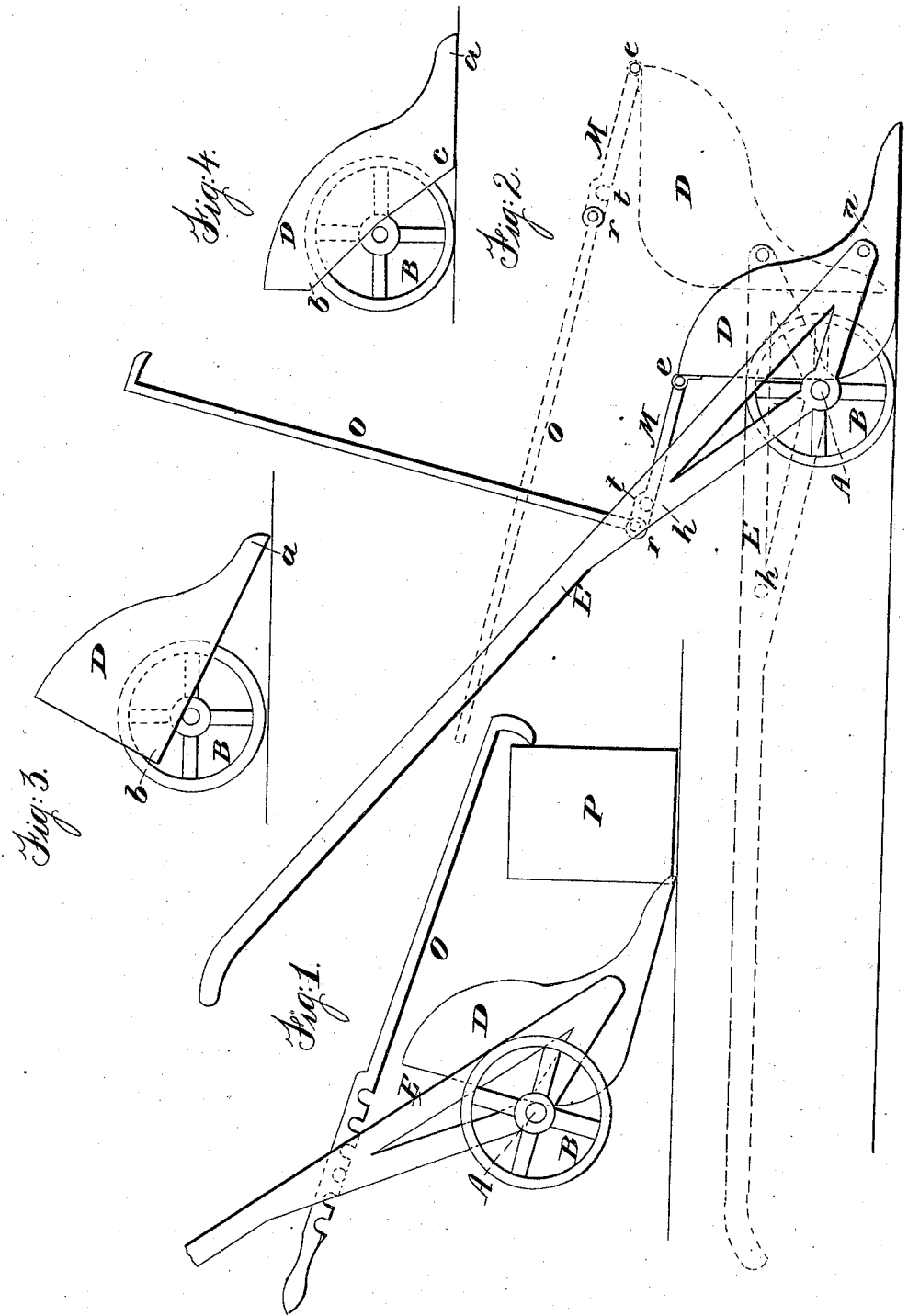

UNITED STATES PATENT OFFICE.

ZE. BUTT, OF LINCOLNTON, NORTH CAROLINA.

HAND-TRUCK.

Specification of Letters Patent No. 17,314, dated May 19, 1857.

*To all whom it may concern:*

Be it known that I, ZE. BUTT, of the town of Lincolnton, in the county of Lincoln and State of North Carolina, have invented a new and useful machine, which I call an "Improved Truck," the peculiarities of which are that the body of the truck is so pivoted or hung upon the wheels, frame, shafts, or handles as to be placed near or upon the ground to receive its load and be unloaded by tilting or dumping; and I do hereby declare that the following is a full, clear, and exact description of the same, reference being had to the annexed drawing, making part of this specification, in which—

Figure 2 is a side view of the improved truck, shown in two positions. The blue lines show the form and also the position of the different parts while loading. The red lines show the position of the body while unloading.

B, are the supporting wheels of the truck; A, the axles on which the wheels turn, and which also support the frame, shafts or handles. The body of the truck can be placed farther back, so that the center of gravity can rest upon the supporting wheels by either bending or dividing the axle. E, the frame handles or shafts and are attached to the axles A, and when the wheels are small, or low, the point, $n$, is elevated above the center of the wheels so that in dumping the body can be elevated sufficiently to revolve and discharge its load. Between the two handles or frame at ($n$) is hung on pivots, the body of the truck (D). These pivots are attached or pass through the sides of the body either higher, or lower, so that the body can hang low or near the ground and still have room to dump.

M, is a catch or support. Its object is to fix, hold, or sustain the body (when required) in one relative position, either when loading or when loaded and being carried—and is thus accomplished—bring the notch ($t$) over the cross-piece ($h$,) in the frame (E,) and the body D, is then held securely in its proper position, and the catch can very readily be displaced and replaced when required. The catch, M, is attached to the back of the scoop by a hinge joint at $e$, and has in it a notch or notches at $t$.

O, is a rod, or piece, furnished with a hook or hooks at one end the object of which is to catch on or over a box or other heavy article when it is to be loaded upon the truck. It may be attached to the catch, M, by a joint $o$, as is shown in Fig. 2, and then it also serves to draw the body of the truck to its position after unloading, or it may be attached, and used when loading large and heavy bodies, as is shown in Fig. 1.

Uses: This machine can be loaded with a shovel the same as a common wheel barrow, or cart, or if the articles are loose such as grain or sand place the truck in the position shown by the blue lines in the drawing and thrust the scoop under the article to be loaded. To unload remove the notch, $t$, from its connection with the cross piece and the body can be tilted as shown in the red lines Fig. 2.

What I claim as my invention and desire to secure by Letters Patent is—

The manner herein described of constructing, arranging, combining and operating the dumping truck or any other manner or method essentially the same.

ZE. BUTT.

Witnesses:
H. WILLIS ALEXANDER,
JAMES T. McLEOD.